April 3, 1945.   H. W. BROOKS   2,373,075
DOOR CHECK AND CLOSER
Filed April 20, 1944    4 Sheets-Sheet 1
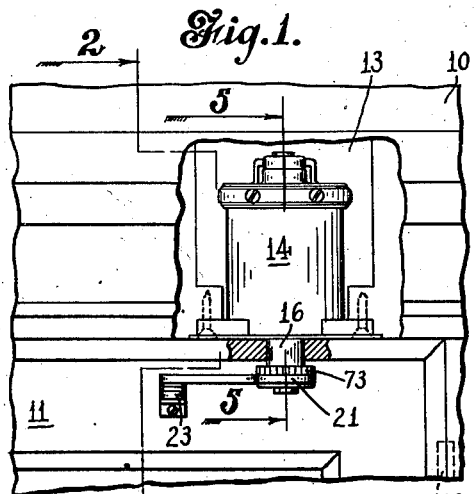
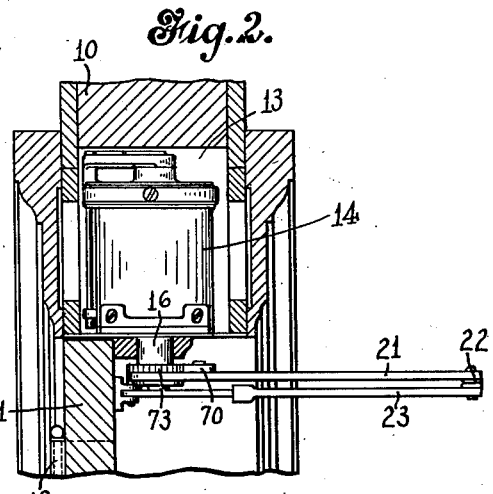
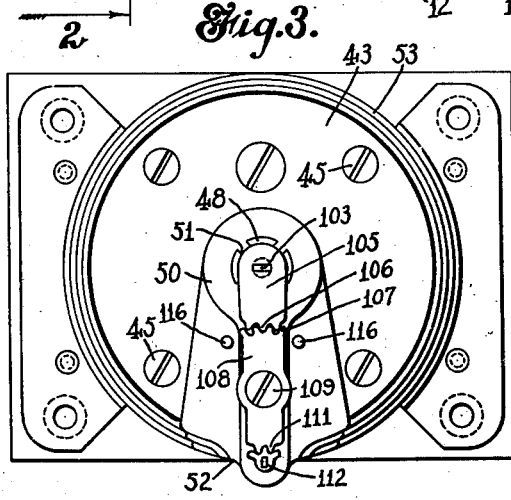
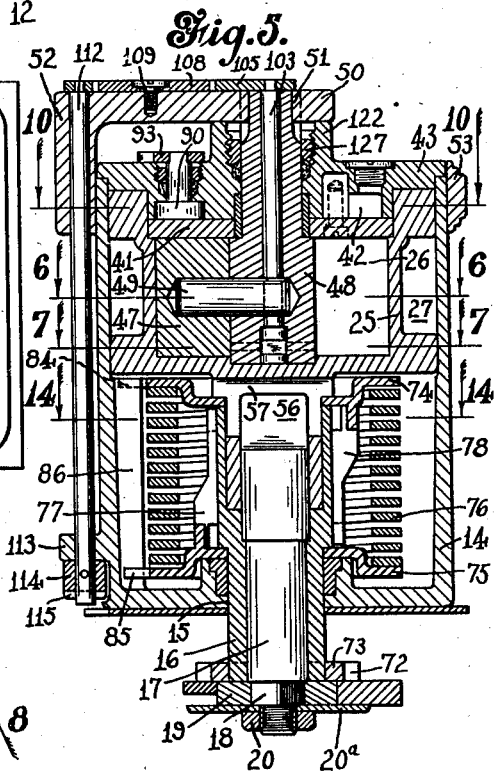
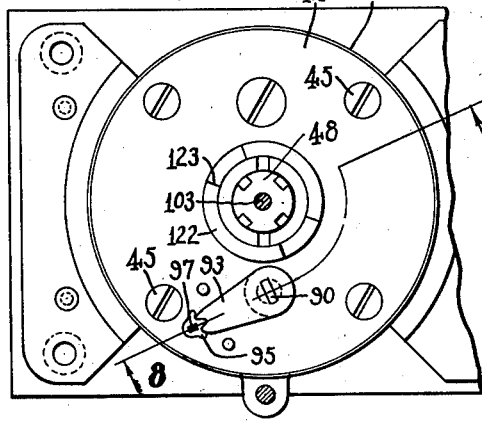
Inventor
Herbert W. Brooks

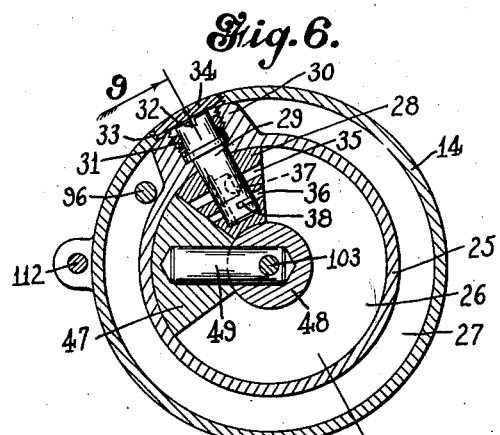
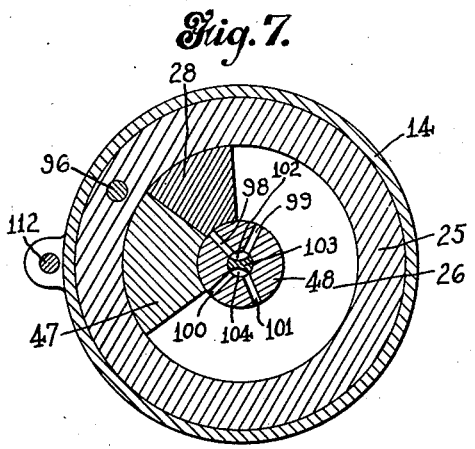
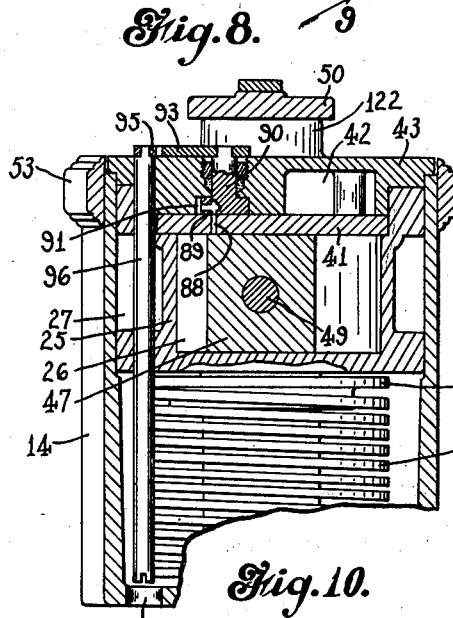
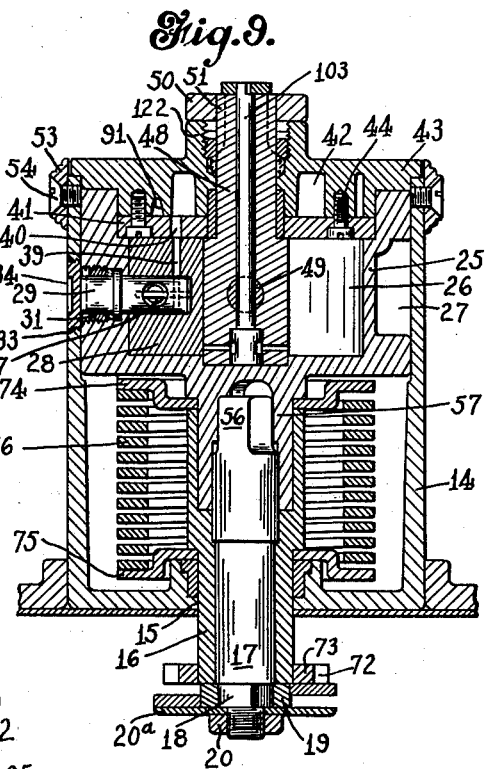
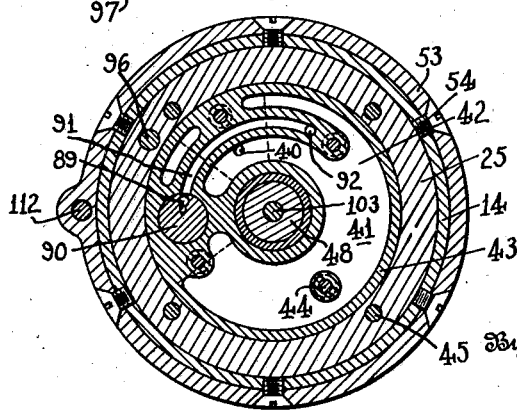

April 3, 1945. H. W. BROOKS 2,373,075
DOOR CHECK AND CLOSER
Filed April 20, 1944 4 Sheets-Sheet 3
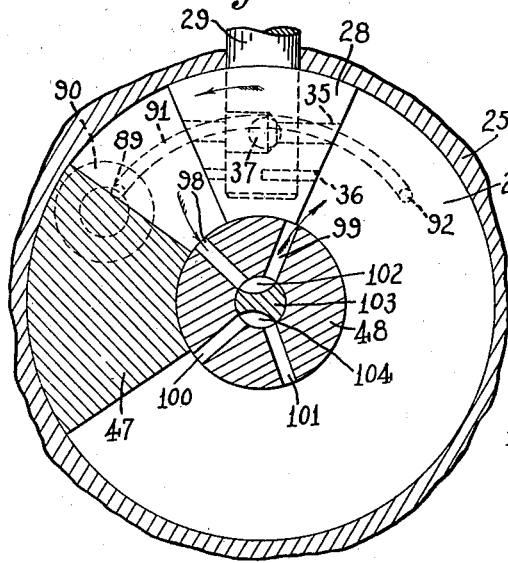
Fig.11.
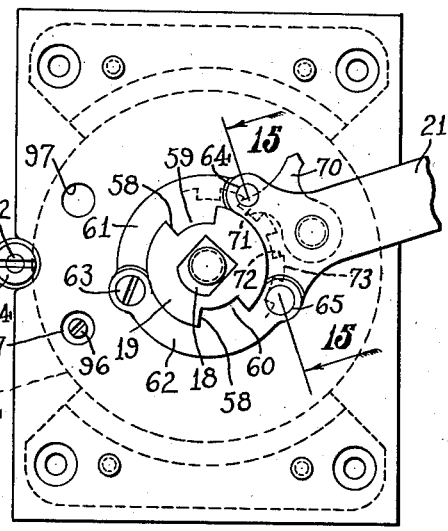
Fig.13.
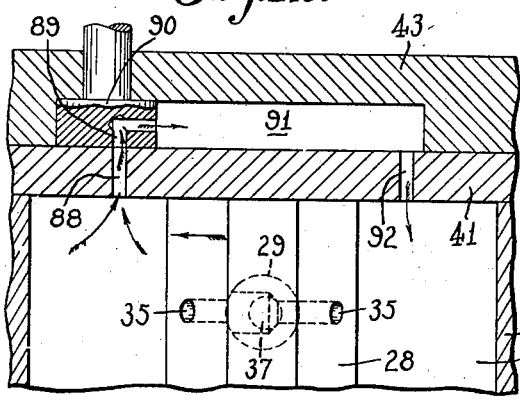
Fig.12.
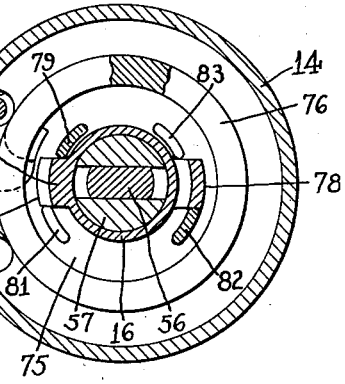
Fig.14.
Fig.15.
Inventor
Herbert W. Brooks
By Rockwell Bartholow
Attorneys April 3, 1945.  H. W. BROOKS  2,373,075
DOOR CHECK AND CLOSER
Filed April 20, 1944  4 Sheets-Sheet 4

Inventor
Herbert W. Brooks
By Rockwell Buchholz
Attorneys

Patented Apr. 3, 1945

2,373,075

UNITED STATES PATENT OFFICE 2,373,075

DOOR CHECK AND CLOSER

Herbert W. Brooks, West Haven, Conn., assignor to Sargent & Company, New Haven, Conn., a corporation of Connecticut Application April 20, 1944, Serial No. 531,893

20 Claims. (Cl. 16—58)

This invention relates to a door check and closer, and more particularly to a device of the type designed to be mounted on a door and connected to the door frame by a jointed arm, or mounted on a door frame and connected to the door by a jointed arm, or mounted within the door casing over the door in a concealed position and connected to the door by a jointed arm, so as to effect in any of the above situations a closing of the door after it has been opened, and to control the closing of the door so that it will not slam but will be brought gently to closed position. Door checks and closers of this general type have usually been designed to be mounted upon the door or within the top rail or hinge stile. In some instances they have been designed for mounting on the door casing or within the door casing over the door. The present device may be mounted on the door, on the door casing, or concealed within the door casing.

It is necessary to provide such devices to operate upon either right- or left-hand doors, depending upon whether the door is hinged at the right or left side, and it is desirable to provide adjustments for the closing of the door and for the control of the same, so that the closer and check may operate efficiently regardless of different weather conditions and regardless of the friction which might oppose the door's closing. In other words, they should be provided with means to adjust the spring which serves to bring about the closing action, and also means to adjust the checking or controlling of the closing motion so that this last movement may be effected at the proper speed.

In addition it is desirable to provide an arrangement whereby, when the door in its closing movement reaches a nearly closed position, the check or control will be released at least to some extent so that the door will be finally closed with a quick or snap action to overcome the resistance of the latch bolt and strike.

One object of the present invention is to provide a door check of a universal character which may be mounted either upon the outside of a door or upon the outside of a door casing or in a concealed position within the door frame.

Another object of the invention is to provide a door check and closer such that it may be readily changed from a door check for a left-hand door to one for a right-hand door, whereby the same structure, with a slight adjustment, may be used for a door of either hand.

A still further object of the invention is to provide a door check and closer such that the swinging arm normally employed with the check may be secured either to the top or bottom of the check casing, so that the check casing may be applied either to the door itself, with the arm at the top thereof, or to the door casing or within the door casing with the swinging arm at the bottom thereof.

A still further object of the invention is to provide a door check and closer of novel construction which will be universal in character so far as the mounting of the check is concerned, and which will be applicable to either right- or left-hand doors and will have the proper adjusting devices for adjusting the closing and checking mechanism.

To these and other ends the invention consists in the novel features and combinations of parts to be hereinafter described and claimed.

In the accompanying drawings:

Fig. 1 is a view of my improved door check mounted in concealed position in the casing above the door, some parts being broken away for the sake of clearness;

Fig. 2 is a sectional view on line 2—2 of Fig. 1;

Fig. 3 is a top plan view of the casing of the door check;

Fig. 4 is a view similar to Fig. 3, with a portion of the casing removed to show the underlying structure;

Fig. 5 is a sectional view on line 5—5 of Fig. 1;

Fig. 6 is a sectional view on line 6—6 of Fig. 5;

Fig. 7 is a sectional view on line 7—7 of Fig. 5;

Fig. 8 is a sectional view substantially on line 8—8 of Fig. 4;

Fig. 9 is a sectional view on line 9—9 of Fig. 6;

Fig. 10 is a sectional view on line 10—10 of Fig. 5;

Fig. 11 is an enlarged sectional view similar to Fig. 7, showing the operation of the device;

Fig. 12 is a diagrammatic sectional view showing the passages for the fluid during the operation of the device;

Fig. 13 is a bottom plan view of the device shown in Fig. 1;

Fig. 14 is a sectional view on line 14—14 of Fig. 5;

Fig. 15 is a sectional view on line 15—15 of Fig. 13;

Figure 16:
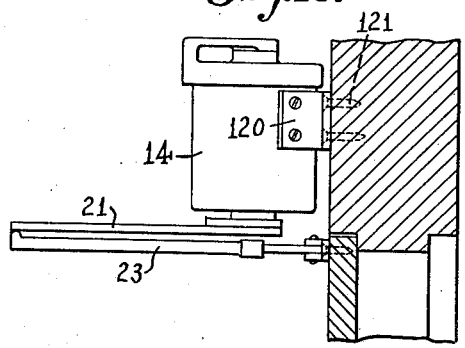
Fig. 16 is a side elevational view showing the casing of the door check mounted upon the exterior of the door casing.

To illustrate one preferred embodiment of my invention I have shown in Fig. 1 of the drawings a door casing 10 upon which is hingedly mounted the door 11, the latter being hinged at 12 to swing away from the observer. As shown, the door casing is provided with a chamber 13 within which is mounted the casing 14 of the door check.

As shown more especially in Fig. 5, the casing 14 is provided with an opening 15 in its lower end through which rotatably projects a sleeve 16, within which sleeve is rotatably mounted a shaft 17. The shaft 17 is provided with a reduced end 18 (Fig. 13) of non-circular shape, and upon this end of the shaft is clamped a washer 19 by the nut 20 and the retainer 20a. As will be hereinafter set forth, the washer 19 is designed to have connected thereto the swinging arm 21 to which is pivoted at 22 a second arm 23 designed in the form shown to be connected to the door.

Rotatably mounted within the casing 14 is a cylinder 25, this cylinder being a cup-shaped member having an interior chamber 26 and having an annular recess in its exterior wall to provide a space 27 between the cylinder and the interior wall of the casing. The chamber 26 constitutes the fluid chamber of the device, and secured to the cylinder 25 and disposed within this chamber is a vane or abutment 28 which constitutes the moving vane or piston. This vane is secured to the cylinder by means of a pin 29 mounted in a lug 30 on the exterior wall of the cylinder, so that the vane will rotate with the cylinder. This pin may be secured in place by a gland nut 31, and is provided with a slot 32 in its outer end by which it may be rotated by a screw driver or like tool inserted through an opening 33 in the casing, the opening being normally closed by a threaded cap 34.

Passages 35 and 36 are formed through the vane 28, the passage 35 being controlled by a check valve 37 mounted in the pin 29 so that fluid will pass in one direction through this passage but not in the other direction. The passage 36 is in communication with a semi-circular slot 38 in the pin 29, so that one end of this passage is in communication with the slot when the pin 29 is in the position shown in Fig. 6. The other end of the passage 36 will be cut off from the slot in this position, but will communicate with the slot 38 when the pin 29 is turned through an angle of 180°.

Referring to Fig. 9, it will be noted that the slot 38 is in communication with a vertical passage 39 in the vane 28, this vertical passage communicating through an opening 40 in a plate 41 with a reservoir 42 formed in a cap 43. The reservoir 42 is designed to hold excess fluid, and as this reservoir will always be in communication with the chamber 26 through the passage 39, slot 38 and passage 36, the chamber 26 will be kept supplied with the check fluid. The plate 41 serves as the bottom of the reservoir 42, and is secured to the cap 43 by screws 44, the cap in turn being secured to the cylinder 25 by screws 45 (Fig. 3). Thus, the cap 43, the plate 41, and cylinder all rotate together with the moving vane 28, so that, regardless of the position of the parts, the reservoir 42 will always be in communication with the chamber 26, and this is true whether the pin 29 is in the position shown in Fig. 6, or has been turned through an angle of 180°.

Mounted within the chamber 26 is a stationary abutment 47 which cooperates with the vane 28; that is, referring to Fig. 6, when the cylinder and vane 28 move in a clockwise direction the fluid in the chamber 26 will be compressed against the abutment 47 and forced through the passage 35 past the check valve 37 to the other side of the moving vane. This will be the direction of movement of the parts when the door is being opened, and the check fluid in the chamber 26 will flow freely past the valve 37 in this direction.

The stationary abutment 47 is secured to a stationary rod or post 48 by the pin 49 (Fig. 6), and, as will be seen from Fig. 5, this rod extends upwardly through the rotating cap 43 and is held against rotation by an arm 50 having a non-rotatable connection with the rod at 51 and extending to one side of the casing, where it is secured by the web 52 to a ring 53, which surrounds the casing 14 and is secured thereto by screws 54. Thus the arm will be held against rotation relatively to the casing, as will also be the rod 48 and abutment 47.

As has already been stated, the swinging arm 21 is non-rotatably secured to the end of the shaft 17, and this shaft is provided with an upper flattened end 56 which stands between a pair of depending lugs 57 on the lower side of the cylinder 25 so that when the shaft 17 is rotated, as it will be when the door is opened, the cylinder will also be rotated and cause the vane 28 to travel toward the abutment 47. As shown in Figs. 13 and 15, the washer 19, non-rotatably mounted on the end 18 of the shaft 17, is provided with oppositely disposed recesses 58 within which project lugs 59 and 60 formed respectively on arcuate arms 61 and 62 pivoted together at 63 and having their other ends pivoted at 64 and 65 to the end of arm 21. As shown in Fig. 15, the end of arm 21 is provided with recessed portions 67 and 68 within which the ends of the arms 61 and 62 lie, one of these recesses being on the lower side of the arm 21 and the other being on the upper side. Also pivoted to the arm 21 is a dog 70 having a tooth 71 adapted to engage in notches 72 of a disk 73 secured to the sleeve 16, so that the sleeve will be rotated when the arm 21 and shaft 17 are rotated.

Surrounding the sleeve 16 are upper and lower plate-like members 74 and 75, to which the upper and lower ends of the closing spring 76 are respectively connected. Secured to the sleeve 16 are laterally extending wings 77 and 78. The wing 77 engages at its upper end a lug 79 on the plate 74, and also has a lower depending end 80 which engages a lug 81 on the plate 75. In like manner the wing 78 engages at its upper and lower ends lugs 82 and 83 on the plates 74 and 75, respectively. With this arrangement the sleeve 16 when rotated in one direction will serve to rotate the plate 74, and when rotated in the other direction will tend to rotate the plate 75, so as to wind up the spring whenever the sleeve 16 rotates. The plates 74 and 75 are provided with laterally projecting lugs 84 and 85 which engage a rib 86 on the casing so that these plates can be rotated only in one direction, and will be held against rotation in the opposite direction, so that one of the plates 74, 75 will always be held against rotation to effect the winding of the spring.

The spring, being wound up when the door is opened, will act upon the arm 21 to close the door when the latter is released, the force of the spring being exerted through the sleeve 16 and dog 70. This will bring about the movement of the moving vane 28 in the opposite or counterclockwise direction, as shown, for example, in Fig. 11. It will be understood that during the opening movement of the door this vane has been moved from the position in Fig. 6 to a position in contact with the other side of abutment 47. During the movement of the vane 28 in this reverse or counterclockwise direction the fluid in the chamber 26 will not be permitted to flow through the passage 35, as the check valve 37 will then close. It is therefore necessary to provide some other passage to permit the fluid to flow from one side of the vane 28 to the other side and thus permit the door to close, and it is by control of the passage of the fluid in this direction that the speed of the closing of the door is controlled.

In order to provide a by-pass for the fluid about the vane 28, an opening 88 is provided in the plate 41, which opening at its lower end communicates with the chamber 26, and at its upper end with a passage 89 in a plug 90 rotatably mounted in the cap 43. The passage 89 in turn communicates with an arcuate horizontally extending passage 91, the other end of which communicates through an opening 92 in the plate 41 with the chamber 26 on the other side of the moving vane 28, so that when the vane 28 travels in an anticlockwise direction the fluid passes from the chamber 26 through the passage 88 and lateral passage 91 to the other side of the vane. The effective size of the passage 88 may be controlled by rotating the plug 90 so as to bring the lower end of passage 89 out of or partly out of registration with the passage 88 and cut down the effective area of the communication between these openings. For this purpose the plug 90 extends outwardly through the cap 43, as shown in Fig. 8, and to its end is non-rotatably secured a plate 93 having a toothed end in engagement with a gear segment 95 secured to the upper end of a shaft 96, which extends downwardly through the cylinder into a space in the casing 14 about the spring 76, the bottom of the casing being provided with openings 97 through which a tool may be inserted to rotate the shaft 96 and thus adjust the plug 90. It will be recalled that the cap 43 rotates with the cylinder 25, as does also the plug 90 and plate 41, so that the relation just described between these parts is maintained at all times. The shaft 96 likewise rotates in the casing 14 about the spring.

It will be obvious that, as shown in Fig. 12, for example, when the plug 90 is rotated, thus cutting down the communication between the passages 88 and 89, a smaller amount of fluid will be permitted to flow through the passage 91, and thus effect a slower closing of the door, or, in other words, effect greater opposition to the action of the spring 76.

Referring to Fig. 11, it will be seen that the post 48 is provided with radial passages 98, 99, 100 and 101, and that the passage 98 is, as shown in this figure, in communication with the passage 99 through a recess 102 in a shaft 103 rotatably mounted in the post 48, and that passages 100 and 101 are likewise in communication through a recess 104 in the shaft. In Fig. 11 the movable vane 28 is shown moving in a counterclockwise direction in the direction of the arrow, and in the position corresponding to that when the door is almost closed. It will be seen that the port or passage 88 is about to be closed by the stationary abutment 47, it being remembered that this port is in a part of the device which moves with the moving vane. Also the passage 99 is about to be uncovered by the movement of the vane 28. When this vane has moved a slight distance in a counterclockwise direction from the position shown, the port 88 will be closed, thus closing the by-pass about the vane 28, but the passage 99 will be opened, thus permitting the fluid to flow from the high-pressure side of the vane through the passage 98 and emerge from the passage 99 on the low-pressure side of the vane. This will bring about a quick and sharp closing of the door at the end of its movement to overcome the opposition of the bolt and strike.

When the check is converted into one for a door of the other hand, passages 100 and 101 will take over and become operative instead of the passages 98 and 99. At this time the vane, of course, will travel in the opposite direction when the door is being closed, and the port 92 will be the one which will be closed by the stationary abutment 47. The change of the mechanism from one of one hand to one of the other hand is accomplished merely by turning the pin 29 through an angle of 180°. This will reverse the position of the check valve 37 so that it will permit the fluid to flow through the passage 35 in the opposite direction. It will also reverse the position of the slot 38 so that the reservoir will be in communication with the chamber 26 through the opposite end of the passage 36. In other words, the reservoir is always in communication with the chamber on the low-pressure side of the moving vane 28.

Adjustment of the shaft 103 in order to adjust the sharp closing movement of the door may be effected by rotating this shaft to a slight extent so as to cut down the communication between the passages 98 and 99 and the passages 100 and 101. This shaft is rotated by means of the mechanism shown in Figs. 3 and 5, wherein an arm 105 is secured to the upper end of this shaft above the member 50, this arm being provided with teeth 106 engaging cooperating teeth 107 on a lever 108 pivoted at 109 to the member 50. The lever 108 has teeth 111 upon its opposite end engaged with the teeth on the upper end of shaft 112 rotatably mounted in the web 52 and extending downwardly without the casing through a lug 113. To the extended end of this shaft is pinned a collar 114 having a slot 115 which may be engaged by a screw driver or similar tool. It will be apparent that when the shaft 103 is rotated the effective size of the recesses 102 and 104 communicating with the passages 98, 100 and 101 will be changed. The lever 108 may be limited in its lateral movement by stop pins 116 (Fig. 3).

In Fig. 16 of the drawings I have shown my improved door check mounted upon the outside of the door casing instead of in a concealed position within the casing, as shown in Figs. 1 and 2. The construction is precisely the same as has been previously described, except that a bracket 120 is secured to the side of the casing 14, the bracket being secured to the wall by the screws 121.

Figure 17:
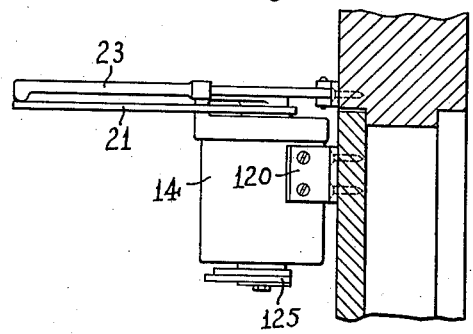
Fig. 17 is a view similar to Fig. 16, showing the door check mounted upon the swinging door.
Figure 18:
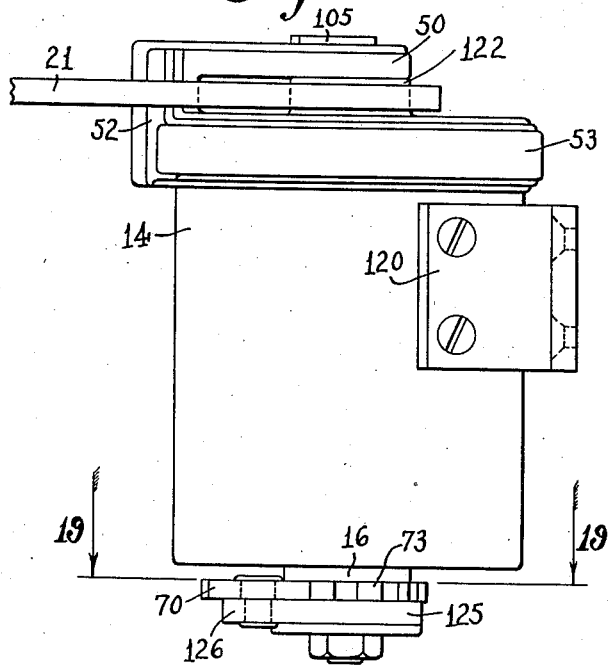
Fig. 18 is an enlarged side elevational view of the door check shown in Fig. 17.
Figure 19:
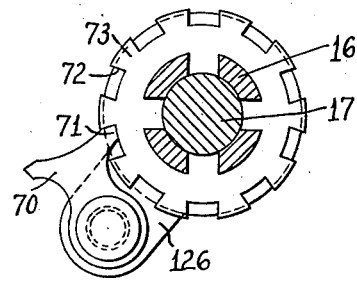
Fig. 19 is a sectional view on line 19—19 of Fig. 18.

In Fig. 17 of the drawings the door check is shown as being installed in a position wherein the casing of the check mechanism is secured to the door and the arm 23 secured to the door frame or casing. It will be noted that in this instance the arm 21 is secured at the top of the casing instead of at the bottom, as in Figs. 1 and 16. In order to secure the arm 21 at the top of the casing, the cap 43 (Figs. 4 and 5) is provided with an upwardly projecting neck 122 having recesses 123 therein to receive the lugs 59 and 60 on the arcuate members 61 and 62, so that the arm 21 is secured directly to the rotating cylinder 25. This, as will be obvious, also serves to rotate the shaft 17, and in order to wind the spring 76 it is, of course, necessary to secure this shaft to the sleeve 16. This is effected, as shown in Figs. 18 and 19, wherein a collar 125 is secured to the non-circular end of the shaft 17, this collar being provided with a projecting arm 126 upon which the dog 70 is pivoted to engage the notches 72 of the member 73. Thus the members 16 and 17 are connected in the same manner as before, so that when the arm 21 is rotated both shaft 17 and cylinder 25 will be rotated to wind the spring 76 and also control the closing of the door.

It will be apparent that I have provided a door check of universal application, which may be applied in a position in which the casing is secured to the door frame, either in concealed or exposed position, or may be secured to the door itself, as shown in Fig. 17, and which may be employed with a slight adjustment for either right- or left-hand doors. Moreover, the door-controlling arm 21 may be secured either to the upper or to the lower end of the casing, as is convenient.

Suitable packing 127 may be provided in the neck 122 about the post 48 to prevent leakage of fluid about this pin. There will, however, be little tendency for the fluid to leak at this point, as it is contemplated that the casing of the check will always be mounted in position with this end uppermost. As the fluid is contained within the cylinder 25, there will be little danger of any leakage at the lower end of the device.

While I have shown and described some preferred embodiments of my invention, it will be understood that it is not to be limited to all of the details shown, but is capable of modification and variation within the spirit of the invention and within the scope of the claims.

What I claim is:

1. In a door closer, a casing, means therein for controlling the movements of a door incident to the opening and closing thereof including two relatively movable members mounted within the casing, a control arm, means projecting from each end of the casing to which said arm may be secured, said last-named means each being connected to one of said members, said controlling means comprising a cup-shaped liquid-containing member, and one of said means being located wholly below said member.

2. In a door closer, a casing, a fluid-containing member rotatably mounted therein, cooperating movable and fixed abutments in said member to check the closing of the door, means projecting from each end of the casing and non-rotatably connected to said member by which the latter may be rotated when the door is opened, and a spring operatively connected to said member to urge return rotation thereof.

3. In a door closer, a casing, a fluid-containing member in said casing and having an imperforate bottom, cooperating abutments in said member, one of which is movable and the other of which is fixed relatively to the containing member whereby one of said abutments is moved against the fluid therein, a plurality of means non-rotatably secured to one of said abutments, one of said means projecting from the top of the casing and the other from the bottom thereof, and an arm securable to either of said means and moved by the movement of the door to be controlled.

4. A door closer as in claim 3, wherein said containing member is rotatably mounted in the casing and one of said abutments is secured thereto, and said means is secured to said member to rotate the same when the door is opened.

5. A door closer as in claim 3, wherein said containing member is rotatably mounted in the casing and one of said abutments is secured thereto, and said means is secured to said member to rotate the same when the door is opened, and a post extending axially of the containing member and held against movement with respect to the casing, said post being secured to the other of said abutments.

6. A door closer comprising a casing, a fluid-containing member rotatably mounted therein, an abutment rotatable with said member against the fluid therein, a shaft non-rotatably connected to said member and projecting from the casing, an arm moved by the opening of the door and connected to said shaft, and a spring in the casing wound by the relative rotation of the shaft and casing.

7. A door closer comprising a casing, a fluid-containing member rotatably mounted therein, an abutment rotatable with said member against the fluid therein, a shaft non-rotatably connected to said member and projecting from the casing, an arm moved by the opening of the door and connected to said shaft, a spring in the casing wound by the relative rotation of the shaft and casing, and a second abutment in said member fixed against movement relatively to the casing.

8. A door closer comprising a casing, a fluid-containing member rotatably mounted therein, an abutment rotatable with said member against the fluid therein, a shaft non-rotatably connected to said member and projecting from the casing, an arm moved by the opening of the door and connected to said shaft, a spring in the casing wound by the relative rotation of the shaft and casing, a second abutment in said member, a post to which said abutment is secured projecting from said member, and means securing said post against rotation relatively to the casing.

9. A door closer comprising a casing, a fluid-containing member rotatably mounted therein, an abutment rotatable with said member against the fluid therein, a shaft non-rotatably connected to said member and projecting from the casing, an arm moved by the opening of the door and connected to said shaft, a spring in the casing wound by the relative rotation of the shaft and casing, and said fluid-containing member having a cap provided with a projecting neck for the attachment of said arm.

10. A door closer comprising a casing, a fluid-containing member rotatably mounted therein, an abutment rotatable with said member against the fluid therein, a shaft non-rotatably connected to said member and projecting from the casing, an arm moved by the opening of the door and connected to said shaft, a spring in the casing wound by the relative rotation of the shaft and casing, said fluid-containing member having a cap provided with a projecting neck for the attachment of said arm, and said shaft projecting from the end of the casing opposite said neck.

11. A door closer comprising a casing, a fluid-containing member rotatably mounted therein, an abutment rotatable with said member against the fluid therein, a shaft non-rotatably connected to said member and projecting from the casing, an arm moved by the opening of the door and connected to said shaft, a spring in the casing wound by the relative rotation of the shaft and casing, said spring surrounding said shaft, and a member connected to the shaft for rotation therewith and also connected with one end of the spring.

12. A door closer comprising a casing, a fluid-containing member rotatably mounted therein, an abutment rotatable with said member against the fluid therein, a shaft non-rotatably connected to said member and projecting from the casing, an arm moved by the opening of the door and connected to said shaft, a spring in the casing wound by the relative rotation of the shaft and casing, a rotatable pin securing said abutment to the fluid-containing member, a passage through said pin, and a check valve controlling said passage.

13. A door closer comprising a casing, a fluid-containing member rotatably mounted therein, an abutment rotatable with said member against the fluid therein, a shaft non-rotatably connected to said member and projecting from the casing, an arm moved by the opening of the door and connected to said shaft, a spring in the casing wound by the relative rotation of the shaft and casing, a rotatable pin securing said abutment to the fluid-containing member, a passage through said pin, and a check valve controlling said passage, said casing having an opening providing access to said pin for rotating the same.

14. A door closer comprising a casing, a fluid-containing member rotatably mounted therein, an abutment rotatable with said member against the fluid therein, a shaft non-rotatably connected to said member and projecting from the casing, an arm moved by the opening of the door and connected to said shaft, a spring in the casing wound by the relative rotation of the shaft and casing, said containing member being disposed at the upper end of the casing, and said shaft projecting from the lower end thereof, a post projecting axially from the casing at the upper end thereof and secured against rotation relatively thereto, and a second abutment in the containing member secured to said shaft.

15. A door closer comprising a casing, a fluid-containing member rotatably mounted therein, an abutment rotatable with said member against the fluid therein, a shaft non-rotatably connected to said member and projecting from the casing, an arm moved by the opening of the door and connected to said shaft, a spring in the casing wound by the relative rotation of the shaft and casing, a closure cap for said containing member, and means on said cap for securing said arm thereto.

16. A door closer comprising a casing, a fluid-containing member rotatably mounted therein, an abutment rotatable with said member against the fluid therein, a shaft non-rotatably connected to said member and projecting from the casing, an arm moved by the opening of the door and connected to said shaft, a spring in the casing wound by the relative rotation of the shaft and casing, said spring surrounding said shaft, and a member connected to the shaft for rotation therewith and also connected with one end of the spring, said last-named member comprising a sleeve surrounding said shaft.

17. A door closer comprising a casing, a fluid-containing member rotatably mounted therein, an abutment rotatable with said member against the fluid therein, a shaft non-rotatably connected to said member and projecting from the casing, an arm moved by the opening of the door and connected to said shaft, a spring in the casing wound by the relative rotation of the shaft and casing, said spring surrounding said shaft, a member connected to the shaft for rotation therewith and also connected with one end of the spring, said last-named member comprising a sleeve surrounding said shaft, and means for adjusting the connection between said shaft and sleeve to adjust the tension of said spring.

18. A door closer comprising a casing, a fluid-containing member rotatably mounted therein, an abutment rotatable with said member against the fluid therein, a shaft non-rotatably connected to said member and projecting from the casing, an arm moved by the opening of the door and connected to said shaft, a spring in the casing wound by the relative rotation of the shaft and casing, a closure cap for said containing member, means on said cap for securing said arm thereto, a second abutment member in said member, a post secured thereto and projecting from the cap, and means securing said post against rotation relatively to the casing.

19. A door closer comprising a casing, a fluid-containing member rotatably mounted therein, an abutment rotatable with said member against the fluid therein, a shaft non-rotatably connected to said member and projecting from the casing, an arm moved by the opening of the door and connected to said shaft, a spring in the casing wound by the relative rotation of the shaft and casing, a closure cap for said containing member, means on said cap for securing said arm thereto, a second abutment member in said member, a post secured thereto and projecting from the cap, means securing said post against rotation relatively to the casing, and passages in said post to permit the fluid in the containing member to be by-passed about said first abutment.

20. A door closer comprising a casing, a fluid-containing member rotatably mounted therein, an abutment rotatable with said member against the fluid therein, a shaft non-rotatably connected to said member and projecting from the casing, an arm moved by the opening of the door and connected to said shaft, and a spring in the casing wound by the relative rotation of the shaft and casing, said spring lying below said containing member.

HERBERT W. BROOKS.